United States Patent
Hsu et al.

(10) Patent No.: US 6,392,591 B1
(45) Date of Patent: May 21, 2002

(54) GLOBAL POSITIONING SYSTEM

(75) Inventors: William Hsu; Oliver Huang; Vincent Hung; Neil Yang, all of Hsinchu (TW)

(73) Assignee: Evermore Technology, Inc., Hsinchu (TW)

( * ) Notice: Subject to any disclaimer, the term of this patent is extended or adjusted under 35 U.S.C. 154(b) by 0 days.

(21) Appl. No.: 09/813,836

(22) Filed: Mar. 22, 2001

(51) Int. Cl.⁷ .............................. H04B 7/185; G01S 5/02
(52) U.S. Cl. ............................. 342/357.06; 342/357.12
(58) Field of Search ..................... 342/357.01, 357.06, 342/357.12; 455/38.3, 343; 701/213, 215

(56) References Cited

U.S. PATENT DOCUMENTS 5,448,773 A * 9/1995 McBurney et al. ......... 455/343
5,471,509 A * 11/1995 Wood et al. ................. 375/350
6,125,135 A * 9/2000 Woo et al. ................... 375/130
6,285,314 B1 * 9/2001 Nagatsuma et al. ... 342/357.08

* cited by examiner

Primary Examiner—Dao Phan
(74) Attorney, Agent, or Firm—Rosenberg, Klein & Lee

(57) ABSTRACT

A global positioning system comprises a receiving unit, a satellite positioning ASIC (application specific integrated circuit), and a digital interface circuit. The program memory and the micro controller in prior art global positioning system are advantageously replaced by a digital interface circuit. Therefore, the global positioning system of the present invention can achieve the advantages of miniature size, reduced cost and low electrical current consumption.

3 Claims, 2 Drawing Sheets

GLOBAL POSITIONING SYSTEM

FIELD OF THE INVENTION

The present invention relates to a global positioning system, especially to a global positioning system with miniature size, reduced cost and low electrical current consumption.

BACKGROUND OF THE INVENTION

The global positioning system (GPS) is a positioning apparatus receiving positioning signal from positioning satellites to recognize the position (longitude and latitude) itself.

As shown in FIG. 1, the prior art global positioning system mainly comprises a receiving unit 1, a satellite positioning ASIC (application specific integrated circuit) 2, a data memory 6, a program memory 7 and a micro controller 8, wherein the micro controller 8 is connected to a communication receiver 10 such as a personal digital assistant (PDA) via an RS-232 connection port 9.

However, the above-mentioned prior art global positioning system has the problem of high electrical current consumption and high cost It is the object of the invention to provide a global positioning system with miniature size, reduced cost and low electrical current consumption to overcome above-mentioned drawbacks.

To achieve the above-mentioned object, the present invention provides a global positioning system, which is characterized in that a digital interface circuit is used to replace the data memory, the program memory and the micro controller; and a serial-parallel bus is provided to connect with external communication unit.

The various objects and advantages of the present invention will be more readily understood from the following detailed description when read in conjunction with the appended drawing, in which:

DETAILED DESCRIPTION OF PREFERRED EMBODIMENT

Figure 1:
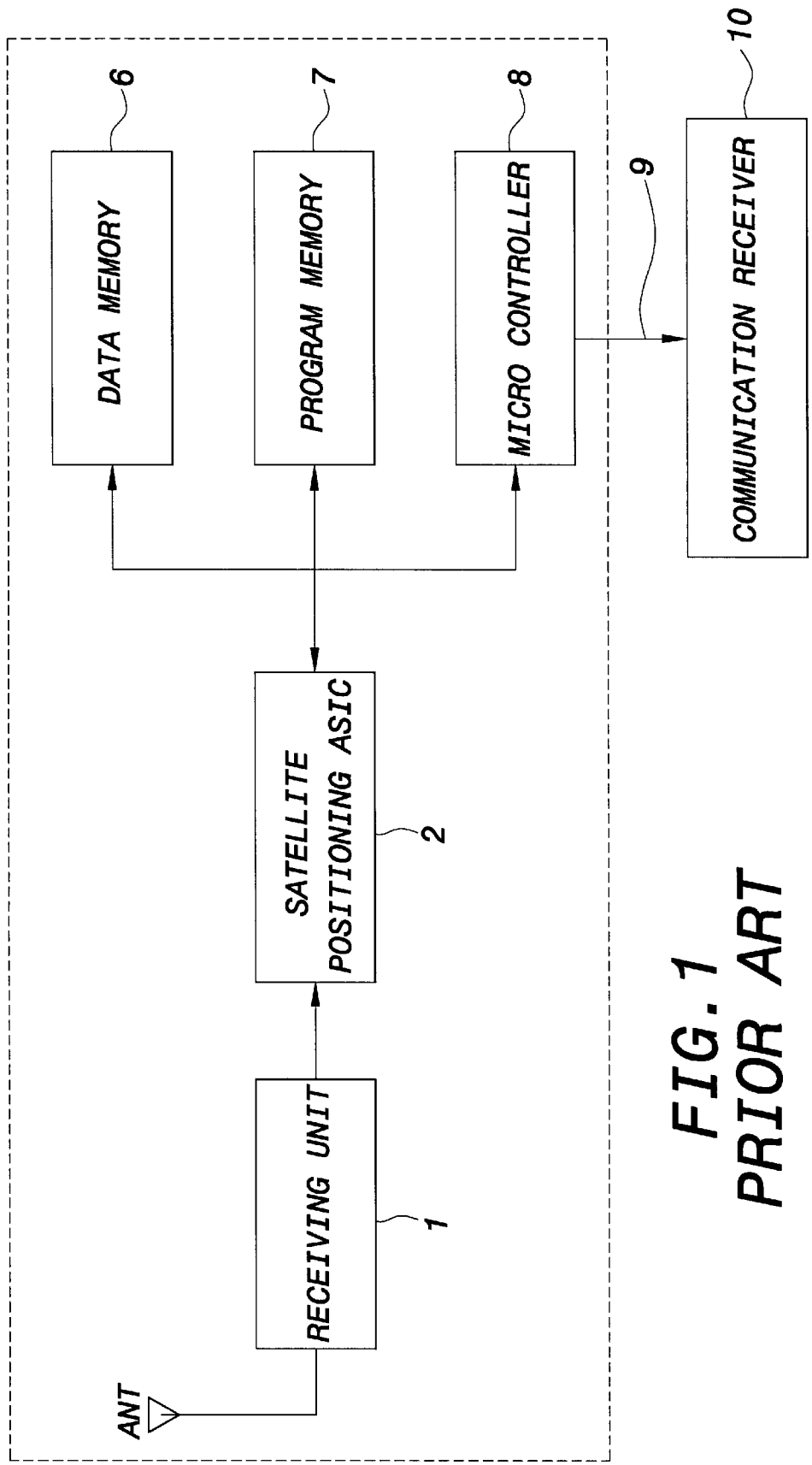
FIG. 1 shows the block diagram of a prior art global positioning system.
Figure 2:
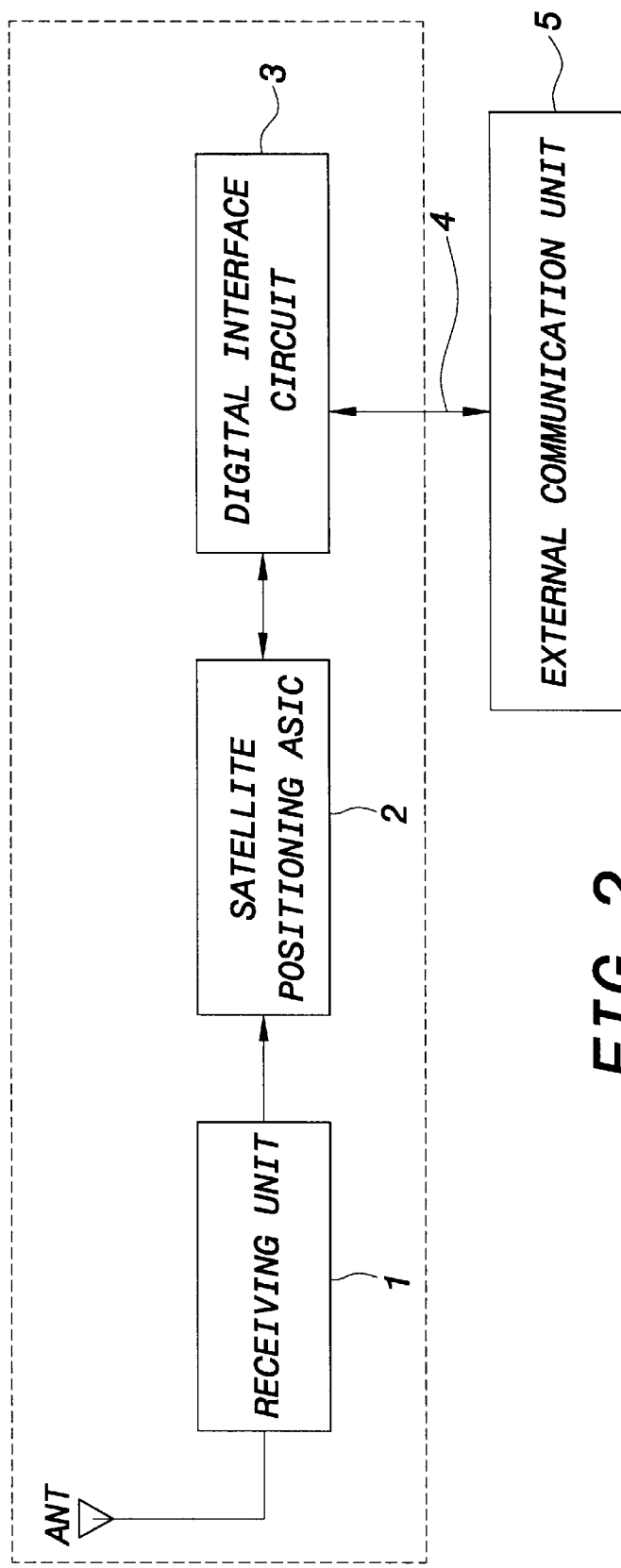
FIG. 2 shows the block diagram of the global positioning system according to the present invention.

FIG. 2 shows the block diagram of the global positioning system according to the present invention. The global positioning system according to the present invention mainly comprises a receiving unit 1, a satellite positioning ASIC (application specific integrated circuit) 2, and a digital interface circuit 3.

The receiving unit 1 is functioned to amplify the signal received by antenna ant and demodulated the signal.

The satellite positioning ASIC 2 is connected to the output of the receiving unit 1 and calculate the position thereof by the output data from the receiving unit 1.

The digital interface circuit 3 is connected to the output of the satellite positioning ASIC 2. According to a preferred embodiment of the present invention, the digital interface circuit 3 is a field programmable gate array (FPGA), a 8051 chip or a USB (universal serial bus) controller to bridge the satellite positioning ASIC 2 and an external communication unit 5. The external communication unit 5 is connected to the output of the digital interface circuit 3 through a serial-parallel data bus 4. For example, the external communication unit 5 can be a personal computer, a mobile phone or a PDA. The serial-parallel data bus 4 can be an RS-232 port, a parallel port or a USB port.

To sum up, by the present invention, the data memory, the program memory and the micro controller are advantageously replaced by a digital interface circuit. Therefore, the global positioning system of the present invention can achieve the advantages of miniature size, reduced cost and low electrical current consumption.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

We claim:

1. A global positioning system for connecting to an external communication and processing unit comprising:

a receiving unit amplifying a global positioning satellite signal and demodulating the amplified global positioning satellite signal;

a satellite positioning ASIC connected to an output of the receiving unit for calculating the position thereof from the demodulated global positioning satellite signal, where the output of the satellite positioning ASIC is raw receiver position data;

a serial-parallel data bus having two termini and implemented in RS-232 serial communication protocol, Universal Serial Bus (USB) serial bus protocol or IEEE 1284 parallel communication bus protocol; and a digital interface circuit connected to an output of the satellite positioning ASIC for transferring the raw receiver position data from the satellite positioning ASIC to a first terminus of the serial-parallel data bus.

2. The global positioning system as in claim 1, wherein the digital interface circuit is a field programmable gate array (FPGA), a 8051 chip or a USB (universal serial bus) controller.

3. The global positioning system as in claim 1, wherein the raw receiver position data is received by a personal computer, a mobile phone or a personal digital assistant (PDA) connected to a second terminus of the serial-parallel data bus.

* * * * *